United States Patent
Reitmeier et al.

(10) Patent No.: US 6,790,533 B2
(45) Date of Patent: *Sep. 14, 2004

(54) SELF-ADHESIVE THERMALLY CROSSLINKABLE 1-COMPONENT SILICONE COMPOSITIONS

(75) Inventors: Rudolf Reitmeier, Burghausen (DE); Philipp Mueller, Burghausen (DE); Guenter Vogl, Altoetting (DE); Hans-Joerg Winter, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 6 days.

This patent is subject to a terminal disclaimer.

(21) Appl. No.: 10/145,269

(22) Filed: May 14, 2002

(65) Prior Publication Data

US 2002/0187358 A1 Dec. 12, 2002

(30) Foreign Application Priority Data

May 31, 2001 (DE) .......................................... 101 26 563

(51) Int. Cl.$^7$ .......................... B32B 25/20; C08L 83/04
(52) U.S. Cl. ...................... 428/447; 427/387; 524/437; 524/492; 524/493; 524/588; 528/31; 528/32; 528/34; 528/42; 528/43
(58) Field of Search .......................... 428/447; 427/387; 524/588, 437, 472, 493, 492; 528/31, 32, 34, 42, 43

(56) References Cited

U.S. PATENT DOCUMENTS

| | | | |
|---|---|---|---|
| 4,077,943 A | * 3/1978 | Sato et al. ...................... 528/15 |
| 4,868,063 A | * 9/1989 | Okamura et al. ............ 428/429 |
| 5,276,086 A | * 1/1994 | Arai et al. ................... 524/730 |
| 5,384,075 A | * 1/1995 | Okami ........................ 252/511 |
| 5,418,065 A | * 5/1995 | Fujiki et al. ................. 428/451 |
| 5,658,674 A | 8/1997 | Lorenzetti et al. |
| 5,792,812 A | * 8/1998 | Fujiki et al. ................. 525/105 |
| 6,106,954 A | * 8/2000 | Meguriya et al. ............ 428/447 |
| 6,251,990 B1 | * 6/2001 | Meguriya et al. ............ 524/862 |
| 2001/0049414 A1 | * 12/2001 | Muller et al. ................ 524/588 |
| 2002/0049274 A1 | * 4/2002 | Azechi et al. ............... 524/440 |

FOREIGN PATENT DOCUMENTS

| | | | |
|---|---|---|---|
| CA | 2323738 A1 | * 6/2001 | ........... C08K/5/541 |
| EP | 0 686 671 A2 | 12/1995 | |
| EP | 0 875 536 A2 | 11/1998 | |
| EP | 1 085 053 A2 | 3/2000 | |
| EP | 1 041 117 A2 | 10/2000 | |
| EP | 1 045 006 A2 | 10/2000 | |
| EP | 1 106 662 A2 | 6/2001 | |

OTHER PUBLICATIONS

Excerpt from A German–English Dictionary for Chemists, Apr. 1963, p. 181.*
Derwent Abstract Corresponding To EP–A 875536 [AN 1998–559408].
Derwent Abstract Corresponding To EP 1 085 053 [2001–336488].
Derwent Abstract Corresponding To EP 1 106 662 [2001–537677].

* cited by examiner

Primary Examiner—Jeffrey B. Robertson
(74) Attorney, Agent, or Firm—Brooks Kushman P.C.

(57) ABSTRACT

The invention relates to self-adhesive thermally crosslinkable 1-component silicone compositions which contain the components defined in claim 1

(A) diorganopolysiloxane,
(B) filler which is selected from filler (B1) having a specific surface area of at least 50 m$^2$/g, aluminum hydroxide (B2) and mixtures thereof,
(C) organohydrogenpolysiloxanes,
(D) organosilcon compound having a vinyl radical, epoxy group, acroyloyloxy or methacryloyloxy group and hydrolyzable groups and
(E) hydrosilylation catalyst or peroxide crosslinking agent, the Mooney viscosity of the silicone compositions, determined at 25° C. according to DIN 53523 Part 3, being 20 to 200.

11 Claims, No Drawings

SELF-ADHESIVE THERMALLY CROSSLINKABLE 1-COMPONENT SILICONE COMPOSITIONS

BACKGROUND OF THE INVENTION

1. Field of the Invention

The invention relates to self-adhesive, thermally crosslinkable 1-component silicone compositions having a long shelf-life, to silicone elastomers obtainable therefrom, and to their use in manufacturing composite moldings.

2. Background Art

The adhesion of crosslinked silicone elastomers to numerous substrates, such as plastics, metals and glasses, is known to be low, i.e. if an addition-crosslinking silicone elastomer material is applied to a substrate and then crosslinked, the resulting silicone elastomer can, as a rule, be peeled away from the substrate surface without difficulty, i.e. by application of but slight tensile forces. Frequently, spontaneous delamination of the silicone elastomer from the substrate may occur. However, since strong and permanent adhesion of the silicone elastomer to the substrate is of decisive importance in numerous applications, a large number of special measures have been proposed for obtaining a strong bond between substrate and silicone elastomer.

In principle, the adhesive strength of the silicone elastomer/substrate laminate can be increased by suitably modifying the chemical and/or physical characteristics of the substrate or of the substrate surface prior to application of the crosslinking silicone elastomer composition. Modification can be effected, for example, by pretreating the substrate surface with adhesion-promoting additives (i.e. primers), by plasma treatment of the substrate surface, by mixing special additives into the substrate, by controlling the morphology of the substrate, by increasing the surface roughness, etc. These measures have, inter alia, the disadvantage that additional process steps are required or the characteristics of the substrate have to meet special requirements.

In the case of high temperature-crosslinking systems, the adhesive strength of the silicone elastomer/substrate composite can be increased by changing the chemical and/or physical characteristics of the addition-crosslinking silicone elastomer material in a controlled manner. Numerous adhesion-promoting additives are known which when mixed with the uncrosslinked silicone material, give rise to self-adhesion of the resulting silicone elastomer on various substrates. These include compounds which contain highly reactive functional groups, such as alkoxy, epoxy, carboxyl, amino, etc., these groups generally being chosen such that the adhesion promoter is capable of reacting both with the substrate and with a silicone elastomer constituent. Although such adhesion promoters may make it possible to dispense with pretreatment of the substrate, the adhesive strength obtained frequently is not satisfactory. Furthermore, the adhesive strength can be increased only to a limited extent by higher adhesion promoter content since the highly reactive groups contained in the adhesion promoter have an increasingly adverse effect on performance characteristics such as shelf-life, crosslinking characteristics (inhibition), toxicology, etc. For these reasons, interest tends to be focused on keeping the content of adhesion promoters as low as possible.

EP-A-686 671 describes a self-adhesive addition-crosslinking material which manages without special adhesion promoters due to the presence of unique reactive polymer constituents. The adhesion-promoting constituent is either an organohydrogenpolysiloxane with minimally two SiH groups on average and whose monovalent Si-bonded radicals consist of at least 12 mol % of hydrocarbon radicals having an aromatic ring, or is a compound with at least one SiH group on average and which contains a group consisting of two aromatic rings, the two aromatic rings being separated from one another by —$R^{13}R^{14}Si$—, —$R^{13}R^{14}SiO$—, —$OR^{13}R^{14}SiO$— or —$R^{13}R^{14}SiOR^{13}R^{14}Si$— and the radicals $R^{13}$ and $R^{14}$ being monovalent hydrocarbon radicals. The adhesion-promoting constituent can thus simultaneously be the crosslinking agent of the silicone elastomer material. Good adhesion to organic plastics (especially ABS) is achieved with this composition, while at the same time easy demoldability is exhibited from metallic vulcanization molds, i.e. chromium- or nickel-plated steel molds or mold produced from aluminum alloy.

The high content of 12 mol % or more of radicals containing aromatic rings in the SiH-containing, adhesion-promoting constituent of the compositions of EP-A-686 671, however, results in considerable incompatibility with the other constituents of the addition-crosslinking silicone elastomer material, leading on the one hand, to partial separation (exudation) during storage, necessitating repeated homogenization of the constituent-containing component before use. This incompatibility, which is evident simply from a milky haze in the uncrosslinked material, also manifests itself in substantially reduced transparency of the silicone elastomer parts produced therefrom. If the adhesion-promoting constituent simultaneously acts as a crosslinking agent of the silicone elastomer composition, the incompatibility leads to vulcanization disturbances which result in inhomogeneous network formation and poor mechanical vulcanization properties. In order to overcome these vulcanization disturbances, an SiH-containing crosslinking agent completely compatible with the silicone elastomer material must be used in addition to the adhesion-promoting SiH-containing constituent, which however results in other disadvantages, for example higher compression set, and higher tendency to exude the adhesion-promoting constituent. The high content of aromatic radicals in the SiH-containing, adhesion-promoting constituent also causes a considerable structural viscosity and thixotropy of the silicone elastomer material, which is undesirable in numerous applications for example in injection molding and in liquid silicone rubber. Moreover, the curable silicone mixture of EP-A-686 671 has a very limited shelf-life, so that metering of the platinum catalyst or mixing with the H-siloxane component must occur only a few minutes to hours prior to vulcanization. Finally, the adhesion of this composition to metals is also insufficient.

EP-A-875 536 describes a self-adhesive addition-crosslinking silicone rubber blend which is distinguished in that the SiH crosslinking agent contains at least 20 SiH groups, the remaining radicals being aliphatically saturated; the composition contains an epoxy-functional alkoxysilane and/or alkoxysiloxane; and further optionally a peroxide. The use of glycidyloxypropyltrimethoxysilane (Glymo) is particularly preferred. The silicone rubber blend described in EP-A-875 536 is suitable in particular for the production of composite moldings which consist of the silicone elastomer and an organic plastic. However, the composition described in EP-A-875 536 has the disadvantage that sufficient adhesive strength can be achieved only with the use of very Si-rich crosslinking agents having on average at least 20 SiH groups per molecule. For instance, the crosslinking agents exemplified in the examples have 30 SiH groups per molecule. The use of such high-functionality crosslinking agents reduces the shelf-life of addition-crosslinking silicone rubber blends considerably, i.e. the flowability is greatly impaired, which can lead to stiffening of the material. As a result, proper processing of the material, for example by injection molding, is no longer possible. In addition, relatively large amounts of epoxy-functional alkoxysilane/ alkoxysiloxane have to be used in order to achieve a high adhesive strength, with the result that the crosslinking rate is considerably reduced. Although this can partly be compensated by employing a peroxide, as described in EP-A-875 536, only peroxides having a low initiation temperature, such as the disclosed 2,4-dichlorobenzyl peroxide, are suitable for this purpose owing to the necessarily low crosslinking temperature (softening of the organic plastic). These peroxides are both toxicologically suspect owing to the cleavage and secondary products liberated (PCB problems), and further adversely affect the shelf-life of the material. Moreover, these blends can be stored for only a relatively short time, with pot lives in the range of minutes, so that no 1-component products for processing by composite producers can be made available therefrom, but only 2-component or A/B systems.

In the case of addition-crosslinking silicone materials, however, 2-component systems are associated with numerous disadvantages, for example, complicated logistics and a high danger of contamination, in particular of the platinum component or of A/B components with one another, so that partial crosslinking may inadvertently occur during storage. Moreover, an additional step for mixing A and B components is required, which leads to a very sensitive intermediate. This necessitates immediate processing and frequent cleaning of the metering plants, mixing and processing machines, etc., since the material remaining as a result of back-mixing or adhesion to surfaces gels relatively rapidly.

EP-A-1 041 117 describes a readily adhering addition crosslinkable 1-component silicone elastomer composition which contains an organopolysiloxane having both SiH and alkenyl groups and a compound having both alkenyl and hydroxyphenyl groups in the same molecule. The preparation of such silicone elastomer compositions is very complicated and therefore not economical. Moreover, this 1-component blend, too, does not have a long shelf-life but has to be processed rapidly after addition of the platinum catalysts described. It thus also has disadvantages in terms of logistics and cleaning, as in the case of A/B systems.

EP-A-1 045 006 discloses improvement of adhesion in highly viscous, peroxide-crosslinkable silicone elastomer materials (HTV), wherein silatrane derivatives, for example silatrane derivatives of a mixture 2-hydroxyethylamine, methyltrimethoxysilane, and allyl glycidyl ether, are added to the silicone rubber blend in order to obtain good adhesion to organic resins such as PBT or FPP, during vulcanization. Such additives are, however, toxicologically unsafe, both during incorporation in the plant and during the production and use of the composite, since they can release aggressive cleavage products.

In summary, it may be stated that none of the conventional addition-crosslinking silicone elastomer compositions satisfactorily meet the requirements set for a self-adhesive silicone elastomer material which is to be used in particular for the production of composite moldings or for the encapsulation of electrical/electronic parts, namely:
a) good processability and shelf-life,
b) high crosslinking rate at relatively low temperatures,
c) high adhesive strength on organic plastics, metals and glasses,
d) easy demoldability from vulcanization molds,
e) toxicological safety, and
f) high level of performance characteristics, i.e. transparency, noncorrosiveness, good mechanical and/or electrical property profiles.

It would be desirable to provide a heat-crosslinkable 1-component silicone elastomer material which has good self-adhesion to organic plastics, metals and glasses, which does not have the disadvantages discussed previously and which meet the above requirements.

SUMMARY OF THE INVENTION

The invention pertains to self-adhesive, thermally crosslinkable, 1-component silicone compositions comprising an alkenyl-functional diorganopolysiloxane (A), a specific filler or mixture of fillers (B), an SiH-functional organohydrogenpolysiloxane (C), a hydrosilylation catalyst or peroxide crosslinking agent (E), and an organosilicon compound (D) bearing two different functional groups, one group being a vinyl radical or an epoxy or (meth) acryloyloxy group, and one group being a hydrolyzable group.

DETAILED DESCRIPTION OF THE PREFERRED EMBODIMENT(S)

Diorganopolysiloxane (A) comprises the general formula (1)

$$R^1_a R^2_b SiO_{(4-a-b)/2} \qquad (1),$$

in which
$R^1$ is a hydroxyl radical or a monovalent, optionally halogen-substituted $C_{1-20}$ hydrocarbon radical optionally containing O, N, S or P atoms, and being free of aliphatically unsaturated groups,
$R^2$ is a monovalent, aliphatically unsaturated, optionally halogen-substituted $C_{2-10}$ hydrocarbon radical optionally containing O, N, S or P atoms,
b denotes values from 0.003 to 2,
with the proviso that $1.5<(a+b)<3.0$, that on average at least two aliphatically unsaturated radicals $R^2$ are present per molecule and that the viscosity of the diorganopolysiloxane (A), determined at 25° C., is at least 100 Pa.s,
(B) a filler which is selected from filler (B1) having a specific surface area of at least 50 m²/g, aluminum hydroxide (B2), and mixtures thereof,
(C) an organohydrogenpolysiloxane of the general formula (2)

$$R^3_c R^4_d R^5_e H_f SiO_{(4-c-d-23-f)/2} \qquad (2),$$

in which
$R^3$ is a monovalent aliphatically saturated $C_{1-20}$ hydrocarbon radical,
$R_4$ is (a) an optionally halogen-substituted monovalent $C_{6-15}$ hydrocarbon radical which contains at least one aromatic $C_6$-ring, or (b) a halogen-substituted, saturated monovalent $C_{2-20}$ hydrocarbon radical optionally containing O, N, S or P atoms,
$R^5$ is a bivalent, optionally halogen-substituted $C_{6-20}$ hydrocarbon radical Si-bonded at both ends, optionally containing O, N, S or P atoms,
e denotes 0 or a positive integer,
c, d, and f denote positive numbers, with the proviso that the organohydrogenpolysiloxane (B) contains on average 3 to less than 20 SiH groups per molecule, that the relationship: $0.05<100\,(d+e)/(c+d+e+f)<12$ is fulfilled, and that the viscosity of the organohydrogenpolysiloxane (B), determined at 25° C., is 1 mPa.s to 100 Pa.s, (D) an organosilicon compound of the general formula (3)

and/or its partial hydrolysis products, in which $R^7$ is a hydrogen radical, a hydroxyl radical or an optionally halogen- or cyano-substituted, monovalent saturated $C_{1-20}$ hydrocarbon radical optionally containing O, N, S or P atoms, $R^8$ is a vinyl radical or an optionally halogen-substituted monovalent $C_{2-20}$ hydrocarbon radical containing at least one epoxy group or substituted by at least one acryloyloxy or methacryloyloxy group, optionally containing O, N, S or P atoms, $R^9$ is a hydrolyzable monovalent optionally halogen-substituted $C_{1-20}$ hydrocarbon radical bonded to Si via an Si—O—C—, Si—O—N— or Si—N-link, optionally containing O, N, S or P atoms, with the proviso that $4>g\geq0$, $4>h>0$, $4>i>0$, $4\geq(h+1)>0$ and $4\geq(g+h+i)$, and (E) a hydrosilylation catalyst or peroxide crosslinking agent, the Mooney viscosity of the silicone compositions, determined at 25° C. according to DIN 53523 Part 3, being 20 to 200.

In the silicone compositions, organohydrogenpolysiloxane (C) acts as an adhesion promoter and, in the case of addition-crosslinkable silicone compositions, simultaneously as a crosslinking agent.

The advantageous properties of the silicone compositions consist in the fact that the self-adhesion after vulcanization is achieved by a constituent contained in every addition-crosslinking material, namely the SiH-containing crosslinking agent (C), in combination with the organosilicon compound (D) having epoxy-, acryloyloxy-, methacryloyloxy- and/or vinyl-functional and hydrolyzable radicals, it merely being necessary for the SiH crosslinking agent (C) to contain a few groups which reduce the compatibility with the other constituents of the material (especially with the diorganopolysiloxane (A)). These latter groups are not reactive functional groups but are preferably inert phenyl groups, with the result that the toxicological safety of the material (e.g. drinking water approval; BGA/FDA approval) is preserved, no vulcanization problems occur, the shelf-life is sufficient, the transparency or translucency of the crosslinked silicone elastomer is maintained, and no constituents which exude or are extractable are added. The combination of the SiH crosslinking agent (C), having reduced compatibility, with an organosilicon compound (D) having epoxy-, vinyl-, acryloyloxy- and/or methacryloyloxy-functional and hydrolyzable radicals, makes it possible, first, to keep the content of incompatible groups in the SiH crosslinking agent low, and secondly, to achieve the adhesion-promoting activity of the organosilicon compound (D) having epoxy-, vinyl-, acryloyloxy- and/or methacryloyloxy-functional and hydrolyzable radicals, even in the case of relatively low SiH functionality of the SiH crosslinking agent. Only the combination of the two constituents (C) and (D) leads to synergistic self-adhesion effects of these two constituents.

In particular, the present composition is distinguished by the fact that a) the crosslinking rate is scarcely reduced, b) the transparency or color of the crosslinked silicone elastomers is not impaired, c) there is no need to accept any disadvantageous changes in the mechanical elastomer properties, d) the adhesion-promoting constituent (C) in the case of addition-crosslinkable composition simultaneously acts as a crosslinking agent (no additional SiH crosslinking agent required), e) strong self-adhesion can be achieved even on metals without hindering the demoldability from metal vulcanization molds, i.e. adhesion to metal shortly after crosslinking permits demolding of the silicone elastomer part whereas if the adhesively bonded silicone elastomer/metal composite is stored, the silicone elastomer becomes strongly and permanently adhered onto the metal surface within a short time, and f) the flowability or processibility of the uncrosslinked material is minimally impaired.

Although the adhesion-promoting constituent (C) of the present invention also has reduced compatibility with the other constituents of the material, which is evident from turbidity upon mixing, this turbidity disappears completely as soon as the material is heated for the purpose of crosslinking, indicating a homogeneous distribution of the molecules throughout the crosslinking agent in the material at the time of crosslinking.

If the adhesion-promoting SiH-containing constituent (C) contains phenyl groups in at least 12 mol % of the radicals, however, this turbidity also persists at customary crosslinking temperatures and indicates inhomogeneous network formation, which can also be demonstrated on the basis of the optical properties, the crosslinking characteristics and the mechanical properties.

Examples of the radicals $R^1$ are alkyl radicals such as the methyl, ethyl, propyl, isopropyl, tert-butyl, n-pentyl, isopentyl, neopentyl, tert-pentyl, n-octyl, 2-ethylhexyl, 2,2,4-trimethylpentyl, n-nonyl and octadecyl radicals; cycloalkyl radicals such as the cyclopentyl, cyclohexyl, cycloheptyl, norbornyl, adamantylethyl or bornyl radicals; aryl or alkaryl radicals such as the phenyl, ethylphenyl, tolyl, xylyl, mesityl or naphthyl radicals; aralkyl radicals such as the benzyl, 2-phenylpropyl or phenylethyl radicals, and derivatives of the above radicals which are halogenated and/or functionalized with organic groups such as the 3,3,3-trifluoropropyl, 3-iodopropyl, 3-isocyanatopropyl, aminopropyl, methacryloyloxymethyl or cyanoethyl radicals. Preferred radicals $R^1$ contain 1 to 10 carbon atoms and optionally halogen substituents. Particularly preferred radicals $R^1$ are the methyl, phenyl and 3,3,3-trifluoropropyl radicals, in particular the methyl radical.

The radicals $R^2$ are reactive in a hydrosilylation reaction. Examples of these are alkenyl and alkynyl radicals, such as the vinyl, allyl, isopropenyl, 3-butenyl, 2,4-pentadienyl, butadienyl, 5-hexenyl, undecenyl, ethynyl, propynyl and hexynyl radical; cycloalkenyl radicals, such as the cyclopentenyl, cyclohexenyl, 3-cyclohexenylethyl, 5-bicycloheptenyl, norbornenyl, 4-cyclooctenyl or cyclooctadienyl radical; alkenyl aryl radicals, such as the styryl or styrylethyl radical, and derivatives of the above radicals which are halogenated and/or contain heteroatoms, such as the 2-bromovinyl, 3-bromo-1-propynyl, 1-chloro-2-methylallyl, 2-(chloromethyl)allyl, styryloxy, allyloxypropyl, 1-methoxyvinyl, cyclopentenyloxy, 3-cyclohexenyloxy, acryloyl, acryloyloxy, methacryloyl or methacryloyloxy radicals. Preferred radicals $R^2$ are the vinyl, allyl and 5-hexenyl radicals, in particular the vinyl radical.

In the case of the diorganopolysiloxanes (A) of the general formula (1), the viscosity determined at 25° C. is preferably at least 1,000 Pa.s, more preferably at least 10,000 Pa.s, preferably not more than 1,000,000 Pa.s, and more preferably not more than 100,000 Pa.s.

Filler (B) is incorporated into the silicone composition in order to achieve a sufficiently high mechanical and/or electrical strength of the crosslinked silicone rubber. Filler (B1) having a specific surface area of at least 50 m²/g, in particular 100 to 400 m²/g, determined by the BET method, has an active reinforcing effect. The actively reinforcing fillers (B1) are preferably precipitated and/or pyrogenic silica. Filler (B2) is aluminum hydroxide, which is also referred to as alumina trihydrate, preferably having a specific surface area of at least 2 m²/g, in particular 3 to 50 m²/g, according to the determination by the BET method.

Aluminum hydroxide (B2) having a particle size of 0.1 to 50 μm, preferably 1 to 30 μm, is preferably used and improves the electrical insulation properties and the flammability. The aluminum hydroxide (B2) may be untreated or surface-treated with vinylsilanes, such as, for example, Martinal® 104S from ALUSUISSE, Martinswerk S. A. and Hymod® 632 or 632 SP from Huber, USA.

The silanization of aluminum hydroxide (B2) can also be carried out during the preparation of the mixture itself, by first introducing the untreated aluminum hydroxide (B2) into the diorganopolysiloxane (A) and then metering in preferably 0.1 to 3% by weight, in particular 0.2 to 2% by weight, based on untreated aluminum hydroxide (B2) of a hydrolyzable vinyl compound, such as vinyltriethoxy- or vinyltrimethoxysilane or divinyltetramethyldisilazane, preferably at 50 to 150° C. Corresponding amounts of difunctional vinyl compounds, such as methylvinyldialkoxysilanes or short-chain SiOH-rich vinylmethylsiloxanes, which can be prepared via an upstream hydrolysis of a methylvinylsilane, are also suitable.

The viscosity of the mixture of diorganopolysiloxane (A) and filler (B) is preferably at least 40,000 Pa.s, more preferably at least 80,000 Pa.s.

Examples of $R^3$ are alkyl radicals such as the methyl, ethyl, propyl, isopropyl, tert-butyl, n-octyl, 2-ethyhexyl and octadecyl radicals, and cycloalkyl radicals such as the cyclopentyl, cyclohexyl, norbornyl or bornyl radicals. Preferred radicals $R^3$ are hydrocarbon radicals having 1 to 10 carbon atoms. A particularly preferred radical $R^3$ is the methyl radical.

Examples of $R^4$ (a) are the phenyl, tolyl, xylyl, biphenylyl, anthryl, indenyl, phenanthryl, naphthyl, benzyl, phenylethyl or phenylpropyl radicals, and derivatives of the above radicals which are halogenated and/or functionalized with organic groups, such as the o-, m- or p-chlorophenyl, pentafluorophenyl, bromotolyl, trifluorotolyl, phenoxy, benzyloxy, benzyloxyethyl, benzoyl, benzoyloxy, p-tert-butylphenoxypropyl, 4-nitrophenyl, quinolyl or pentafluorobenzoyloxy radicals.

Examples of hydrocarbon radicals $R^4$ (b) having 2 to 20 carbon atoms are the 3-chloropropyl, 3-bromopropyl, 3,3,3-trifluoropropyl, 2-fluoroethyl, 1,1-dihydroperfluorododecyl and 2-cyanoethyl radicals. Particularly preferred radicals $R^4$ are the phenyl radical and the 3,3,3-trifluoropropyl radical.

Preferred radicals $R^5$ correspond to the general formula (4)

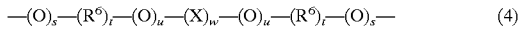

$$-(O)_s-(R^6)_t-(O)_u-(X)_w-(O)_u-(R^6)_t-(O)_s- \quad (4)$$

in which s, t, u and w, independently of one another, denote the values 0, 1 or 2, $R^6$ may be identical or different and denote a bivalent, optionally halogen-substituted hydrocarbon radical which optionally contains O, N, S or P atoms, is free of aliphatically unsaturated groups and contains 1 to 10 carbon atoms, such as —CH₂—, —CH₂—CH₂—, —CH₂—CH₂—CH₂—, —CF₂—, —CH₂—CF₂—, —CH₂—CH—(CH₃)—, —C(CH₃)₂—, —CH₂—C(CH₃)₂—, —C(CH₃)₂, —CH₂—CH₂—CH—O——CF₂—CF₂—O—, —(X)— denotes a bivalent radical which is selected from —Ph—, —Ph—O—Ph—, —Ph—S—Ph—, —Ph—SO₂—Ph—, —Ph—C(CH₃)₂—Ph—, —PhC(CF₃)₂—Ph—, —Ph—C(O)—Ph—, cyclohexylene or norbornylene, —Ph— designating a phenylene group. A particularly preferred radical $R^5$ is the phenylene radical.

The organohydrogenpolysiloxane (C) preferably contains 5 to 18 SiH groups per molecule. The viscosity of the constituent (C), measured at 25° C., is preferably 2 mPa.s to 1 Pa.s. Owing to the labile nature of the SiH group, the constituent (C) may have a low content, typically less than 100 ppm by weight, of Si-bonded OH groups, arising from the preparation.

Examples of the hydrocarbon radicals $R^7$ are alkyl radicals such as the methyl, ethyl, n-propyl, isopropyl, tert-butyl, n-pentyl, isopentyl, neopentyl, tert-pentyl, n-octyl, 2-ethylhexyl, 2,2,4-trimethylpentyl, n-nonyl and octadecyl radicals; cycloalkyl radicals such as the cyclopentyl, cyclohexyl, cycloheptyl, norbornyl, adamantylethyl or bornyl radicals; aryl radicals such as the phenyl, ethylphenyl, tolyl, xylyl, mesityl or naphthyl radicals; aralkyl radicals such as the benzyl, phenylethyl or phenylpropyl radicals; alkenyl or alkynyl radicals such as the vinyl, allyl, isopropenyl, 3-butenyl, 2,4-pentadienyl, butadienyl, 5-hexenyl, undecenyl, ethynyl, propynyl and hexynyl radicals; cycloalkenyl radicals such as the cyclopentenyl, cyclohexenyl, 3-cyclohexenylethyl, 5-bicycloheptenyl, norbornenyl, 4-cyclooctenyl or cyclooctadienyl radicals; aralkenyl radicals such as the phenylethenyl and phenylethynyl radical; and derivatives of the above radicals which are halogen-substituted and/or contain heteroatoms, such as the 3-chloropropyl, 3-bromopropyl, decafluoro-1,1,2,2-tetrahydrooctyl, (p-chloromethyl)phenyl, (p-chloromethyl)phenethyl, hydroxymethyl, hydroxyethyl, hydroxypropyl, hydroxybutyl, 2-bromovinyl, 2-allyloxymethyl, acetyl, acetoxymethyl, acetoxyethyl, acetoxypropyl, 3-phenoxypropyl, benzoyloxypropyl, mercaptopropyl, cyanoethyl, cyanopropyl, 3-cyanobutyl, 3-isocyanatopropyl, 2-(carbomethoxy)ethyl, 10-(carbomethoxy)decyl, 2-(carboxymethylthio)ethyl, 3-carboxypropyl, aminomethyl, aminoethyl, aminopropyl, aminohexyl, aminoethylaminopropyl, 3-(N-allylamino)propyl, (aminoethylaminomethyl)phenethyl, m-aminophenyl, 3-(m-aminophenoxy)propyl, 3-acryloyoxypropyl, 3-acryloyloxy-2-hydroxypropyl, 4-(acryloyloxymethyl)phenethyl, methacryloyloxymethyl, methacryloyloxyethyl and methacryloyloxypropyl radicals. Preferred radicals $R^7$ are the methyl, ethyl, propyl, butyl, octyl, vinyl, allyl, phenyl, 3,3,3-trifluoropropyl and cyanopropyl radicals. Particularly preferred radicals $R^7$ are the methyl, vinyl and phenyl radicals.

Examples of the radicals $R^8$ containing epoxy groups are the epoxyethyl, 2,3-epoxypropyl, 3,4-epoxybutyl, 5,6-epoxyhexyl, 9, 10-epoxydecyl, glycidyloxy, 3-glycidyloxypropyl, glycidyloxyisobutyl, 2-methylglycidyloxypropyl, 3-phenylglycidyloxypropyl, glycidyloxyphenylnonyl, glycidyloxybenzylethyl, 3,4-epoxycyclohexyl, 2-(3,4-epoxycyclohexyl)ethyl, 3-(3,4-epoxycyclohexyl)propyl, 1,4-epoxycyclohexyl and 2-(1,4-epoxycyclohexyl)ethyl radicals. Preferred radicals $R^8$ are the 3,4-epoxycyclohexyl, 3-(3,4-epoxycyclohexyl)propyl and glycidyloxypropyl radicals. Radical $R^8$ preferably has 2 to 10 carbon atoms. A particularly preferred radical $R^8$ is the glycidyloxypropyl radical.

Examples of the monovalent hydrocarbon radicals substituted by an acryloyloxy or methacryloyloxy group and having 2 to 20 carbon atoms are mentioned above for $R^7$.

Hydrocarbon radicals which have no heteroatoms, in particular having 2 to 10 carbon atoms, such as ethyl, propyl or butyl radicals, are preferred.

Examples of the radicals $R^9$ are a) alkoxy, enoxy or aryloxy groups of the general formula $-OR^{10}$, such as the methoxy, ethoxy, n-propoxy, isopropoxy, n-butoxy, sec-butoxy, tert-butoxy, 2-ethylbutoxy, 2-ethylhexyloxy, vinyloxy, allyloxy, isopropenyloxy, cyclobutenyloxy, cyclohexenyloxy, 1,3-butadienyloxy, propargyloxy, phenoxy, benzyloxy, and m- or p-vinylbenzyloxy radicals;

b) acyloxy groups of the general formula $-OCR^{10}$, such as the formyloxy, acetoxy, 2-ethylhexanoyloxy, acryloyloxy, methacryloyloxy, benzoyloxy and norbornylacetoxy radicals;

c) amino groups of the general formula $-NH_2$, $-NHR^{10}$ or $-NR^{10}_2$, such as the dimethylamino, diisopropylamino, allylamino, n-butylamino, sec-butylamino and cyclohexylamino radicals;

d) oxime groups of the general formula $-ON=CH_2$, $-ON=CHR^{10}$ or $-ON=CR^{10}_2$, such as the methyl ethyl ketoxime, methyl isobutyl ketoxime, methyl n-amyl ketoxime, and dimethyl ketoxime radicals;

e) amido groups of the general formula $-NH-C(=O)-R^{10}$ or $-NR^{10}-C(=O)-R^{10}$, such as the N-methylbenzamido or N-methylacetamido radicals;

f) aminoxy groups of the general formula $-ONH_2$, $-ONHR^{10}$ or $-ONR^{10}_2$, such as the hydroxylamino radical; or g) those derivatives of the abovementioned radicals which are halogen-substituted and/or contain heteroatoms or have a more complex composition, such as the p-aminophenoxy, 2-methoxyethoxy, 1-methoxy-2-propoxy, 1-methoxyisopropenyloxy, methoxyethoxyethoxy, 1-methoxy-2-methylpropenyloxy, acryloyloxymethoxy, meth-acryloyloxy-(polyethyleneoxy), furyloxy or N-vinylformamido radical and $-O-Ph-C(=O)-Ph$, $-O-C(CF_3)=CH-C=O)-CF_3$, $-O-C(CH_3=CH-C(=O)-CH_3$, $-O-C(CH_3)_2-CH=CH_2$, $-NH-C(=O)-CH_3$, $-O-C(=O)-CH_2Br$, $-O-C(=O)-CF_3$, $-O-C(=O)-C\equiv CH$ or $-O-CH_2-C(=O)-O-Si(CH_3)_3$, where the radicals $R^{10}$ represent monovalent aliphatic or aromatic, saturated or unsaturated, optionally halogen-substituted hydrocarbon radicals having 1 to 10 carbon atoms. Preferred radicals $R^9$ are the alkoxy radicals such as the methoxy, ethoxy, propoxy and butoxy radicals. The particularly preferred radical $R^9$ is the methoxy radical.

Preferred as organosilicon compound (D), are organofunctional silanes, glycidyloxypropyltrimethoxysilane (Glymo), vinyltrimethoxysilane, vinyltriethoxysilane and methacryloyloxypropyltrimethoxysilane being particularly preferred.

The radicals $R^1$ to $R^{10}$ in all above formulae may be identical or different. Preferred heteroatoms are N, O and S. Preferred halogen substituents are F, Cl and Br.

Hydrosilylation catalyst (E) serves as a catalyst for the addition reaction, termed a hydrosilylation, between the aliphatically unsaturated hydrocarbon radicals $R^2$ of the diorganopolysiloxanes (A) and the silicon-bonded hydrogen atoms of the organohydrogenpolysiloxanes (C). Numerous suitable hydrosilylation catalysts are described in the literature. In principle, all hydrosilylation catalysts corresponding to the prior art and used in addition-crosslinking silicone rubber materials can be used.

For example, metals and their compounds such as platinum, rhodium, palladium, ruthenium and iridium, preferably platinum, can be used as hydrosilylation catalysts (E). The metals can optionally be fixed on finely divided support materials, such as active carbon, metal oxides such as alumina, or silica.

Platinum and platinum compounds are preferably used. Particularly preferred platinum compounds are those which are soluble in polyorganosiloxanes and are inert at a storage temperature up to 40° C. but catalyze the hydrosilylation sufficiently rapidly on heating.

Preferred platinum catalysts (E) include those selected from compounds of the general formulae

(5)

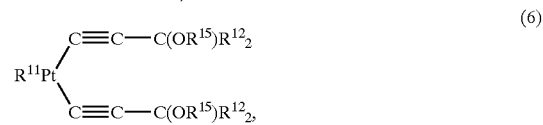

(6)

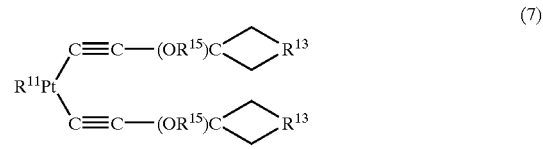

(7)

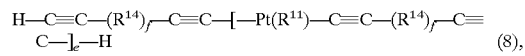

(8), in which $R^{11}$ denotes an optionally substituted diene which is bonded to platinum by at least one π-bond and represents a straight or a branched chain having 4 to 12 carbon atoms or a cyclic ring having 6 to 18 carbon atoms, $R^{12}$ may be identical or different and denotes a hydrogen atom, trialkylsilyl radical, halogen atom or monovalent hydrocarbon radical optionally substituted by halogen atoms or cyano radicals and having 1 to 24 carbon atoms, $R^{13}$ denotes identical or different divalent, optionally substituted hydrocarbon radicals having 1 to 24 carbon atoms, $R^{14}$ may be identical or different and denotes divalent, optionally substituted hydrocarbon radicals having 1 to 12 carbon atoms, silane radicals or siloxane radicals, $R^{15}$ may be identical or different and denotes a hydrogen atom or a monovalent hydrocarbon radical having 1 to 20 carbon atoms, e denotes an integer greater than or equal to 1 and f is 0 or 1.

If $R^{11}$ is a substituted diene or the radicals $R^{13}$ and $R^{14}$ are substituted hydrocarbon radicals, preferred substituents are halogen atoms, such as F, Cl, Br and I, cyano radicals, $-NR^{15}_2$ and groups $-OR^{15}$, $R^{15}$ having the abovementioned meaning.

Cyclooctadiene complexes of platinum having acetylide ligands, as described in EP-A-994 159, are particularly preferred, especially bis(alkynyl)(1,5-cyclooctadienyl) platinum, bis(alkynyl)(1,5-dimethyl-1,5-cyclooctadienyl) platinum and bis(alkynyl)(1,6-dimethyl-1,5-cyclooctadienyl)platinum complexes.

With the use of the platinum catalyst of the general formulae 5 to 8, the crosslinkable silicone compositions are marketable as a 1-component formulation and have a long shelf-life, in particular of at least 3 months at 25° C. and ambient pressure, and crosslink rapidly only at a high temperature. In the preparation of the crosslinkable silicone compositions, it is especially advantageous that the platinum catalyst (E) of the general formulae 5 to 8 can readily be incorporated, that the hydrosilylation reaction does not slow down in the course of the reaction, and that no platinum colloids are formed and no discolorations result through their use.

Peroxide crosslinking agents (E) which may be used are inorganic and organic peroxides, in particular organic peroxides. Examples of such organic peroxides are peroxyketals, e.g. 1,1-bis(tert-butylperoxy)-3,3,5-trimethylcyclohexane and 2,2-bis(tert-butylperoxy)butane; acyl peroxides such as acetyl peroxide, isobutyl peroxide, benzoyl peroxide, di(4-methylbenzoyl) peroxide and bis(2, 4-dichlorobenzoyl) peroxide; dialkyl peroxides such as di-tert-butyl peroxide, tert-butyl cumyl peroxide, dicumyl peroxide and 2,5-dimethyl-2,5-di(tert-butylperoxy)hexane; and peresters such as tert-butyl peroxyisopropylcarbonate.

The self-adhesive crosslinkable 1-component silicone compositions preferably contain 10 to 90% by weight, more preferably 25 to 60% by weight, of diorganopolysiloxane (A); 10 to 80% by weight, more preferably 20 to 60% by weight, of filler (B); 0.1 to 20% by weight, more preferably 0.5 to 5% by weight, of organohydrogenpolysiloxane (C), and 0.1 to 10% by weight, more preferably 0.2 to 2% by weight, of organosilicon compound (D).

The amount of the hydrosilylation catalyst (E) used depends on the desired crosslinking rate and economic points of view. Usually, $1 \times 10^{-5}$ to $5 \times 10^{-2}$% by weight, in particular $5 \times 10^{-4}$ to $5 \times 10^{-3}$% by weight of platinum catalysts, calculated as platinum metal and based on the weight of the silicone compositions, are used.

The amount of the peroxide crosslinking agent (E) used is preferably 0.1 to 5% by weight, more preferably 0.2 to 3% by weight, based on the weight of the silicone compositions.

The self-adhesive crosslinkable 1-component silicone compositions can optionally contain further constituents (F), such as nonreinforcing fillers, inhibitors, stabilizers, pigments and catalysts. All components (A) to (F) may contain a single compound or a mixture of different compounds.

The self-adhesive crosslinkable 1-component silicone compositions preferably have a Mooney viscosity, determined at 25° C. according to DIN 53523 Par t 3, of 15 to 150, more preferably 23 to 95.

The compounding of the self-adhesive crosslinkable 1-component silicone compositions is effected by mixing the abovementioned components in any desired sequence. The thermal crosslinking of the silicone compositions is effected by heating, preferably at 40 to 250° C., more preferably at least 50° C., most preferably at least 100° C., preferably at not more than 200° C., and most preferably at not more than 180° C.

The invention also relates to the silicone elastomers obtainable by crosslinking the self-adhesive crosslinkable 1-component silicone compositions. The self-adhesive crosslinkable 1-component silicone compositions can be bonded to a substrate by applying the silicone compositions to the substrate followed by crosslinking, preferably by heating to 30 to 250° C., to give a composite material, and can advantageously be used, in particular, wherever good adhesive strength between the silicone elastomer and a substrate, preferably a substrate of organic plastics, metals or glasses, is desired. The substrate may be present as a molding, film or coating.

The silicone compositions are suitable for the production of composite materials by coating, adhesive bonding, or casting, and for the production of shaped articles. The silicone compositions are particularly suitable for encapsulating and for adhesively bonding electrical and electronic components and for the production of composite moldings such as composite insulators for medium and high voltage applications. Composite moldings are understood as meaning a shaped article comprising a composite material which is composed of a silicone elastomer part produced from the silicone compositions and at least one substrate, so that there is a strong, permanent bond between the two parts. Such a composite molding is preferably produced by processing a metal or oxidic base element or organic plastic to give a shaped article and then bringing the silicone compositions into contact with this molding and crosslinking them, which can be effected, for example, by injection molding, by means of extrusion, and in a so-called press-molding method. These processes are exemplary and not limiting. Composite insulators are produced, for example, by sheathing rods or tubes of glass fiber-reinforced plastics. Composite materials and in particular composite moldings can be used in a very wide range of applications, for example, in the electronics, household appliances, consumables, construction and automotive industry, in medical technology, in the production of sport and leisure articles, etc.

In the following examples, unless stated otherwise in each case, all pressures are 0.10 MPa (abs.); all temperatures are 20° C.; and all viscosities are measured at a temperature of 25° C.

EXAMPLES

Substrates

The adhesion of the silicone elastomers according to the invention and those not according to the invention was tested on the following substrates:
a) Epoxy resin/glass hard fabric (GFR plastic anhydride curing agent): Hgw 2372 (THYSSENSCHULTE GmbH)
b) Polyamide 6: Durethan® BKV30 (Bayer AG; 30% GF)
c) Polybutylene terephthalate (PBT): Ultradur® B4300G6 (BASF AG; 30% GF)
d) Aluminum (AlMg1, industrial quality; not primed)
e) Steel: V2A stainless steel (1.4541, industrial quality)

Characterization of the Adhesion

A substrate strip having the dimensions 60×25×2 mm is placed in a stainless steel press-mold which is Teflon-coated or treated with mold release agent, and the mold is filled with the silicone elastomer blend to be tested. The vulcanization under pressure is effected for 3 (up to max. 5) minutes at a temperature of 170° C. and a pressure of 30 metric tons. After removal of the laminate, the rigid substrate body is firmly clamped and the maximum separation force required to detach the adhering silicone elastomer strip in the peel test is determined. The separating force is determined according to DIN 53531 and is stated in N/mm. 3–10 laminates are measured per example, the separating force is determined as a mean value and the proportion of cohesive failures, i.e. the roughness of the torn surfaces, is assessed qualitatively.

Preparation of the Adhesion-promoting Mixture V1 Comprising Organohydrogenpolysiloxane (C) with Filler (B)

5.0 kg of a methyl hydrogenpolysiloxane, $Me_3Si$—(—O—SiH(Me))$_n$—O—$SiMe_3$, which has terminal trimethylsilyloxy groups and, according to $^{29}$Si-NMR, has a number average chain length of n=53 and 5.0 kg of a siloxane copolymer having terminal trimethylsilyloxy groups and consisting of dimethylsilyloxy and methylphenylsilyloxy units in a molar ratio of 15.2:21.8 and having a viscosity, measured at 25° C., of 100 mPa.s are initially introduced into a stirrer. 1.8 g of phosphonitrilic chloride, prepared according to U.S. Pat. No. 4,203,913, are added at room temperature with continuous stirring. After application of a vacuum of less than 20 mbar, stirring is carried out for 5 min and the vacuum is then broken with $N_2$. Stirring is then carried out for 2 h at a temperature of 100° C. 14 g of hexamethyldisilazane are added and stirring is carried out for a further 15 min. Finally, a vacuum of less than 10 mbar is applied, the mixture is freed from volatile constituents with continuous stirring for 1 h at 100° C., the vacuum is broken with $N_2$, cooling to room temperature is effected and the reaction product is filtered. A polyorganosiloxane which has terminal trimethylsilyloxy groups, is composed of —O—Si(Me)$_2$—, —O—SiH(Me)— and —O—Si(Me)Ph— units in a molar ratio of 15.2:63.0:21.8 and has a viscosity of 32.1 mm$^2$/s at 25° C. is obtained. The product contains on average 17 Si—H groups per molecule.

This oily PM-containing H-siloxane is mixed with 10% of silica having a BET surface area of 300 m$^2$/g, in order to obtain a viscosity processible by rolling.

Preparation of the Mixture V2 not According to the Invention from Organohydrogenpolysiloxane Containing Filler (B)

Instead of the phenyl-containing crosslinking agent described in example 1, a polyorganosiloxane which has terminal trimethylsilyloxy groups and contains only —O—Si(Me)$_2$— and —O—SiH(Me)— units in the molar ratio 29:71 and has a viscosity of 30 mm$^2$/s at 25° C. is used; this crosslinking agent contains on average 33 Si—H groups per molecule.

Preparation of the Platinum 1-Component Catalyst Batch 589.4 parts by mass of a vinyldimethylsilyloxy-terminated polydimethylsiloxane having a Brabender plasticity of 630 mkp, corresponding to an average molar mass of about 500,000 g/mol, were mixed with 252.6 parts by mass of a hydrophobic pyrogenic silica having a BET surface area of 300 m$^2$/g and a carbon content of 3.95% by weight, which was metered in in portions, in a kneader for 4 hours to give a homogeneous material. The catalyst batch is prepared by homogenizing 500 g of the base material described above with 2.1 g of platinum complex catalyst of the formula [(COD)Pt(p-C≡C—C$_6$H$_4$—SiMe$_3$)$_2$], prepared according to EP-A-994 159, in a kneader for 30 minutes.

Example 1

490 kg of HTV rubber, which is a mixture of 26% of silica having a BET surface area of 300 m$^2$/g and a dimethylpolysiloxane having terminal vinyl groups and viscosity of 33,000 Pa.s (ELASTOSIL® R 401/60 S; having a final Mooney viscosity of 42; available from Wacker-Chemie GmbH), are placed in a one metric ton kneader and mixed in portions with a total of 460 kg of finely divided aluminum hydroxide (Hymod® 632 from Huber, USA), having a BET surface area of 7 m$^2$/g, and 5 kg of vinyltriethoxysilane for 2 h at 80° C. to give an intermediate 1.

5 kg of glycidyloxypropyltrimethoxysilane and 1.5 kg of 1-ethynyl-1-cyclohexanol as an inhibitor are mixed into this in succession prior to discharge. The crude HTV product strained by means of a discharge screw and a 100 μm sieve is converted into the end product on a water-cooled 2-roll mill with a total of 1.8% of V1 and 2% of the platinum 1-component catalyst batch.

The addition-crosslinking 1-component rubber has a Mooney viscosity according to DIN 52523 of 28 (final value) or a dynamic viscosity of 186,000 Pa.s at a shear rate of 1 Hz (angular velocity of 6.3 rad/sec) at 25° C. The initiation temperature is 135° C., and remains stable, like the vulcanization curve, for a storage time of at least 5 months at room temperature.

An arc- and creep-resistant insulator material obtained after press vulcanization at 160° C./15 min (class 1A 4.5 kV according to IEC 60587, stable for at least 6 h at 4.5 kV; or greater than 300 sec arc test according to IEC 61621) has a hardness of 65 (Shore A), a tensile strength of 4.4 N/mm$^2$ and an elongation at break of 550%. The adhesion test on epoxy-GFR plastic a), carried out according to the above method, gave an excellent value of 8.7 N/mm after storage for one day in air/RT, which decreased only insignificantly even after a boiling test for 96 hours. The result was a loss of cohesion in the silicone layer, with considerable residues on the GFR plastic sheet. A good adhesion of 5.1 N/mm is also obtained on glazed surfaces (glass object sheets or glazed aluminum/from Epcos).

Comparative Example 1 (Not According to the Invention, V2)

A homogeneous HTV blend prepared completely analogously to the above intermediate 1 is mixed not with an epoxysilane but only with 1.5 kg of 1-ethynyl-1-cyclohexanol in the same kneader and purified as above through a 100 μm sieve.

On the cooled roll, blend V2 (without phenyl groups) is incorporated in an equivalent amount so that the same Si—H crosslinking agent content results. The end product is then prepared once again with 2% of the platinum 1-component catalyst batch described. The addition-crosslinking insulator rubber obtained has good electrical and mechanical properties very similar to those of the self-adhesive product according to the invention, of example 1: Mooney viscosity 29, initiation temperature 139° C.; and after the analogous vulcanization, a hardness of 74 (Shore A), tensile strength 4.9 N/mm$^2$.

However, the adhesion test on the same epoxy resin/GFR plastic gave only low values of less than 1 N/mm (the readily delaminatable GFR plastic sheets showed no silicone residues at all). In the case of this creep-resistant HTV rubber, a preceding primer step would additionally be necessary in order to prepare a stable composite for high-voltage applications.

Comparative Example 2 (Not According to the Invention, V2+Epoxysilane)

Comparative Example 1 is repeated except that this time 0.5% of epoxysilane is also mixed in, as in example 1 according to the invention. Although an excellent "insulator rubber" is likewise obtained, the adhesion values after vulcanization are scarcely better than in comparative example 1. After a build-up of adhesion for several days in air/RT, values up to about 2.7 N/mm (small amount of silicone residues on the GFR plastic) are then measured. Since however, with the low initial adhesion, there is a great risk here of delamination during removal from the mold directly after mechanical processing, for example during press molding, a preceding primer treatment of the composite substrate is thus required for safety, even with the addition of a functional silane or siloxane.

Example 2

100 parts (by mass) of a long-chain solid HTV polymer having a Brabender plasticity of about 700 mkp or 41,000 Pa.s having the structure of a vinyldimethylsiloxy-terminated polydimethylsiloxane having 0.08 mol % of vinylmethylsilyloxy units in the chain, are initially introduced into a double-trough kneader and mixed with 7 parts of a short-chain dimethylsiloxane having an Si—OH content of 4%. After portion-by-portion addition/homogenization of 37 parts of a hydrophilic pyrogenic silica having a BET surface area of 300 m$^2$/g, a total of 150 parts of an aluminum hydroxide silylated with 1% of vinyltrialkoxysilane (Apyral® 40 VS1 from Nabaltec GmbH, Schwandorf) having a BET surface area of 3 m$^2$/g are incorporated until homogeneity is obtained.

After the addition of 0.6 part of the inhibitor ethynyl-1-cyclohexanol, 1.5 parts of a metal stearate and, if required, a colored paste, the homogeneous intermediate 2 can be discharged and can be purified through a corresponding strainer sieve. Preparation of the end product is effected once again on the cooled roll by incorporation of 2.3% of blend V1, 0.4% of methacryloyloxypropyltrimethoxysilane and 2% of the platinum 1-component catalyst batch described above. The addition-crosslinking 1-component rubber has a Mooney viscosity of 46 (final value).

After press vulcanization at 165° C./15 min, a rubber resistant to high voltage (creep resistance at least 6 h at 4.5 kV according to IEC 60587; arc resistance according to IEC 61621 greater than 300 sec) and having a hardness of 67 (Shore A) and a tensile strength of 4.6 N/mm$^2$ (tear propagation resistance 16.5 N/mm) is obtained. The parting values determined after the adhesion test according to DIN 53531 are 5.4 N/mm on GFR plastic a), 4.4 N/mm on aluminum d) and 6.1 N/mm on V2A stainless steel e). Silicone constituents remain behind on the test substrates.
The GFR plastic adhesion withstands a 96 h boiling test virtually unchanged (less than 10% decrease).

Example 3

68 parts (by mass) of the long-chain solid HTV polymer of example 2 are mixed with 26 parts of the hydrophilic pyrogenic silica of example 2 and 4 parts of a short-chain polydimethylsiloxane to give an HTV rubber having a Mooney viscosity of 33 (final value) (Wacker ELASTO-SIL® R401/50 S, available from Wacker-Chemie GmbH). This rubber is homogenized in a heatable and coolable kneader portion-by-portion with a total of 94 parts of precipitated aluminum hydroxide (Apyral® 40 E from Nabaltec GmbH, Schwandorf) having a BET surface area of 3 m$^2$/g, 1.5 parts of vinyltrimethoxysilane and one part of the hydrophilic pyrogenic silica of example 2 for at least 2 h at 90° C.

This blend is cooled and is mixed with 0.8 part of methacryloyloxypropyltrimethoxysilane and 2.5 parts of glycidyl-oxypropyltrimethoxysilane before discharge/straining. The purified intermediate 3 is converted into the end product on a roll mill with 0.3% of blend V1 and 0.8% of 2,5-dimethyl-2,5-di(tert-butylperoxy)hexane and, if desired, with a desired HTV colored paste to give peroxide-crosslinking 1-component rubber having a Mooney viscosity of 38 (final value). After press vulcanization at 165° C./5 min, a readily demoldable "insulator" rubber resistant to high voltage and having a hardness of 71 and a tensile strength of 6.1 N/mm$^2$ is obtained. It is creep-resistant for at least 6 h at 4.5 kV according to IEC 60587 and arc resistant for greater than 300 sec according to IEC 61621.

The adhesion test on GFR plastic sheets a) gave high parting values of 5–6 N/mm, with silicone residues on the GFR plastic after storage for 1 day (humid air/RT, i.e. build-up of adhesion).

Example 4

The intermediate 3 from example 3 is now converted into the end product on the roll mill only with 1% of di(4-methylbenzoyl) peroxide and optionally with 1% of a reversion stabilizer, a scavenger for acidic cleavage products, and a colored paste.

The peroxide-crosslinking 1-component insulator rubber obtained, having a Mooney viscosity of 37 (final value), can be readily vulcanized on various substrates by means of extrusion at 150° C./20 min. The electrical values likewise comply with the standards as in example 3.

The composite with GFR plastic sheets a), produced under these conditions, showed parting values of 4 N/mm after only about 1 day's storage/adhesion build-up.

Example 5

1.1% of an epoxy/silane or siloxane batch (prepared beforehand by mixing/reacting glycidyloxypropyltrimethoxysilane with about 15% of silanized silica having a BET surface area of 300 m$^2$/g (Wacker HDK® SKS 300)), 2.1% of blend V1, 2% of platinum 1-component catalyst batch and 0.18% of inhibitor 1-ethynyl-1-cyclohexanol are mixed with 100 parts by mass of Wacker Elastosil® R 420/60 S (an HTV rubber which is free of crosslinking agent, has high tensile strength and a viscosity of 51 (final Mooney value) and is prepared from 64 parts (by mass) of the long-chain solid HTV polymer of example 2 and 33 parts (by mass) of silanized silica having a BET surface area of 300 m$^2$ /g, Wacker-Chemie GmbH) on the cooled roll mill.

The addition-crosslinking silicone rubber obtained is stable for at least 5 months at room temperature without a marked change in the viscosity or processibility or deterioration in the vulcanization characteristics. This transparent 1-component silicone rubber having a Mooney viscosity of 41 (final value) can be very readily processed by means of press molding since there is scarcely any adhesion to the mold during cycle times of 2 min (180° C.) to about 5 min (160° C.). A vulcanized product having good tensile strength (tensile strength according to DIN 53504-S1 10 N/mm$^2$; elongation at break about 1100%) and a hardness of 60 (Shore A according to DIN 53505) is obtained.

During pressing on plastics and metals, relatively good adhesion is obtained without priming. The parting values determined by the method described are 7.5 N/mm for polyamide b), 7.7 N/mm for PBT c), over 7 N/mm on aluminum d) and up to more than 8 N/mm for V2A stainless steel. These very good final adhesion values (considerable silicone residues remain on the hard substrate) are established after only a few hours to days, depending on storage conditions, and are stable to steam (after a boiling test).

Comparative Example 3

(Not According to the Invention, Analogous to Example 5 but with V2 Instead of V1)

A blend produced completely analogously to example 5 but containing the blend V2 instead of the blend V1 also gives similarly good mechanical values but substantially poorer adhesion on plastics.

The parting values here are only 2.3 N/mm for polyamide b) and only 1.9 N/mm for PBT c) (in each case relatively smooth delamination).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A self-adhesive thermally crosslinkable 1-component silicone compositions, comprising (A) a diorganopolysiloxane of the general formula (1)

$$R^1{}_aR^2{}_b SiO_{(4-a-b)/2} \quad (1),$$

in which
- $R^1$ is a hydroxyl radical or a monovalent, optionally halogen-substituted $C_{1-20}$ hydrocarbon radical optionally containing O, N, S or P atoms, and being free of aliphatically unsaturated groups,
- $R^2$ is a monovalent, aliphatically unsaturated, optionally halogen-substituted $C_{2-10}$ hydrocarbon radical optionally containing O, N, S or P atoms,
- b denotes values from 0.003 to 2, with the proviso that $1.5<(a+b)<3.0$, that on average at least two aliphatically unsaturated radicals $R^2$ are present per molecule and that the viscosity of the diorganopolysiloxane (A), determined at 25° C., is at least 100 Pa.s, (B) a filler selected from the group consisting of filler (B1) having a specific surface area of at least 50 $m^2/g$, aluminum hydroxide (B2), and mixtures thereof, (C) an organohydrogenpolysiloxane of the general formula (2)

$$R^3{}_c R^4{}_d R^5{}_e H_f SiO_{(4-c-d-23-f)/2} \quad (2),$$

in which
- $R^3$ is a monovalent aliphatically saturated $C_{1-20}$ hydrocarbon radical,
- $R^4$ is (a) an optionally halogen-substituted monovalent $C_{6-15}$ hydrocarbon radical which contains at least one aromatic $C_6$-ring, or (b) a halogen-substituted, saturated monovalent $C_{2-20}$ hydrocarbon radical optionally containing O, N, S or P atoms,
- $R^5$ is a bivalent, optionally halogen-substituted $C_{6-20}$ hydrocarbon radical Si-bonded at both ends, optionally containing O, N, S or P atoms,
- e denotes 0 or a positive integer,
- c, d, and f denote positive numbers, with the proviso that the organohydrogenpolysiloxane
- (C) contains on average 3 to less than 20 SiH groups per molecule, that the relationship: $0.05<100(d+e)/(c+d+e+f)<12$ is fulfilled, and that the viscosity of the organohydrogenpolysiloxane (B), determined at 25° C., is 1 mPa.s to 100 Pa.s, (D) an organosilicon compound of the general formula (3)

$$R^7{}_g R^8{}_h R^9{}_i SiO_{(4-g-h-i)/2} \quad (3)$$

and/or its partial hydrolysis products, in which
- $R^7$ is a hydrogen radical, a hydroxyl radical or an optionally halogen- or cyano-substituted, monovalent saturated $C_{1-20}$ hydrocarbon radical optionally containing O, N, S or P atoms,
- $R^8$ is a vinyl radical or an optionally halogen-substituted monovalent $C_{2-20}$ hydrocarbon radical containing at least one epoxy group or substituted by at least one acryloyloxy or methacryloyloxy group, optionally containing O, N, S or P atoms,
- $R^9$ is a hydrolyzable monovalent optionally halogen-substituted $C_{1-20}$ hydrocarbon radical bonded to Si via an Si—O—C—, Si—O—N— or Si—N-link, optionally containing O, N, S or P atoms,
- with the proviso that $4>g\geq 0$, $4>h>0$, $4>i>0$, $4>(h+1)>0$ and $4\geq(g+h+i)$, and (E) a hydrosilylation catalyst or peroxide crosslinking agent, the Mooney viscosity of the silicone composition, determined at 25° C. according to DIN 53523 Part 3, being 20 to 200.

2. The silicone composition of claim 1, in which the filler (B2) used is aluminum hydroxide having a specific surface area of at least 2 $m^2/g$, according to determination by the BET method.

3. A process for the preparation of a silicone elastomer, in which the silicone composition of claim 1 is heated to 40° C. to 250° C.

4. A process for the preparation of a silicone elastomer, in which the silicone composition of claim 2 is heated to 40° C. to 250° C.

5. A silicone elastomer prepared by the process of claim 3.

6. A silicone elastomer prepared by the process of claim 4.

7. A process for bonding a silicone composition to a substrate, in which a silicone composition of claim 1 is applied to the substrate and then crosslinked by heating to 40° C. to 250° C.

8. A process for bonding a silicone composition to a substrate, in which a silicone composition of claim 2 is applied to the substrate and then crosslinked by heating to 40° C. to 250° C.

9. A composite material prepared by the process as claimed in claim 7.

10. In the preparation of an insulator resistant to high voltage wherein a silicone composition is applied to a substrate, the improvement comprising applying the silicone composition of claim 1 and crosslinking at elevated temperature.

11. In the preparation of an insulator resistant to high voltage wherein a silicone composition is applied to a substrate, the improvement comprising applying the silicone composition of claim 2 and crosslinking at elevated temperature.

* * * * *

UNITED STATES PATENT AND TRADEMARK OFFICE
CERTIFICATE OF CORRECTION

PATENT NO. : 6,790,533 B2
DATED : September 14, 2004
INVENTOR(S) : Rudolf Reitmeier et al.

It is certified that error appears in the above-identified patent and that said Letters Patent is hereby corrected as shown below:

<u>Column 17,</u>
Line 25, delete "(4-c-d-23-f)/2" and insert therefor -- (4-c-d-2e-f)/2 --

Signed and Sealed this

Twenty-sixth Day of April, 2005

JON W. DUDAS
*Director of the United States Patent and Trademark Office*